April 9, 1963 — W. SCHÖNECK — 3,084,986
METHOD FOR MACHINE CONTROL
Filed March 23, 1959
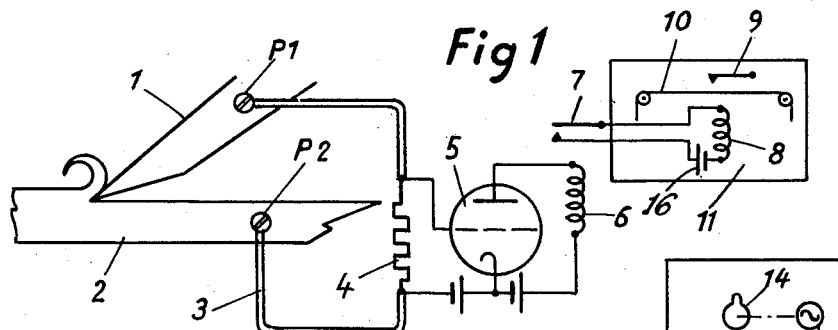
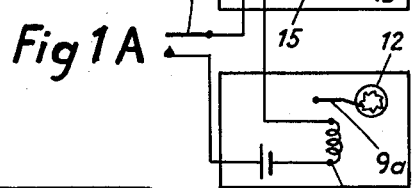
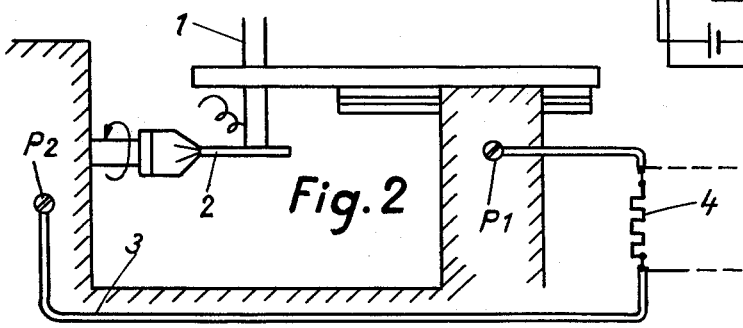
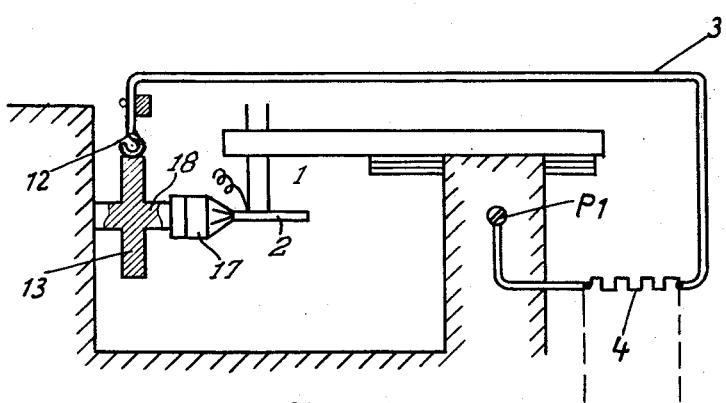
INVENTOR
WALTER SCHÖNECK
By Hane and Nydick
ATTORNEYS United States Patent Office 3,084,986
Patented Apr. 9, 1963

3,084,986
METHOD FOR MACHINE CONTROL
Walter Schöneck, Dusseldorf, Germany, assignor to Telefonaktiebolaget L M Ericsson, Stockholm, Sweden, a corporation of Sweden
Filed Mar. 23, 1959, Ser. No. 801,335
5 Claims. (Cl. 346—25)

The invention relates to methods for controlling machines, such as metal cutting machine tools, clipping or punching machines, hammers, rolling mills and press machines.

The purpose of the invention is to provide for the registering (recording or integrating) of the productive time of a machine (machine time) in a recording or integrating instrument that is controlled by an impulse sending device governed by the machine. The instrument is thereby actuated each time the tool of the machine works on the workpiece so that an effective supervision of one or a number of machines is made possible (for example for central recording or integrating of the effective machine time for a number of machines).

Heretofore, mechanical arrangements or electrical current limiting relays have been used for this purpose. However, the results obtained have usually been complicated and, in some instances, the system would continue to function during the idle time of the machine.

The method of employing the thermo potential of the workpiece at the point of contact between the work-piece and the tool and the temperature corresponding thereto to determine the workability of the working material or life of the tool steel at different cutting speeds and thicknesses of chip, is known.

However, in accordance with the present invention this thermo potential is instead used for governing the impulse sending device that controls the instrument so that the machine time will be recorded or integrated in the instrument in response to this thermo potential. The invention gives a general and essentially simple method to solve the foregoing problem with a single piece of equipment and, on the whole, independently of the design of the machine.

The invention will now be further described with reference to the accompanying drawing, which shows apparatus for carrying out the method applied to three different machines. FIG. 1 shows the application of this method to a cutter, and FIGS. 2 and 3 to a lathe. FIG. 1A shows a modification of a detail. In FIG. 1, 1 indicates the tool, 2 the work-piece, 3 a sensing circuit comprising a resistance 4 and connected to the points P1 and P2 on the tool 1 and the work-piece 2, respectively. The potential drop through the resistance 4 is measured by a registering instrument 11 via an amplifier tube 5 in the anode circuit, in which there is a relay 6 with a contact 7, the latter being included in a circuit comprising a relay 8, which controls an armature 9, which may be formed as a pen and which makes markings on a paper strip 10 to record the working condition of the machine in question as a function of time. Each time the tool works on the work-piece, the thermo potential, caused by the heating up in the contact surface between tool and work-piece, thus causes a marking on the strip 10, and it is possible to read how long the machine has been working and has been standing still.

Of course, it is possible to record or integrate the machine times for several machines on the same paper strip 10, and each machine has then its separate sensing equipment.

The work-piece and the tool may be of different or similar materials as any differences in the surfaces are sufficient for obtaining a thermo potential. A thermojunction is formed between the engaging surfaces of the work piece and the tool such that the thermo-junction together with a portion of the tool and a portion of the work piece form a thermo-couple during the working of the work piece. The rise in temperature in the contact surface between the work-piece and the tool is usually in the magnitude of several hundred degrees Celsius at metal cutting work.

If it is desired to record the machine time on a counting drum, instead of being recorded on a strip as shown in FIG. 1, the arrangement shown in FIG. 1A can be used. In this arrangement, a contact 15 is also included, that is controlled by a cam disc 14, which is driven by a timing device 13, such as a synchronous motor. The contact 15 is thus closed with certain constant time intervals. So long as the contact 7 is closed, i.e. while the tool works the work-piece, the relay 8 with the armature 9a will be actuated each time the contact 15 is closed (for example each minute) thereby driving the counting drum 12 one step forwards, which in this case corresponds to one minute of the machine time. It is thus possible to read on the drum how long a time the machine has been working. When the machine does not work the work-piece, the closing of the contact 15 will not actuate the drum 12, since the contact 7 has not been closed in this case.

The detection of the thermo potential can also be done in the way shown in FIG. 2, by direct connection of the sensing circuit 3 to suitable points P1, P2 on the stand of the machine.

As an alternative, the detection or tapping of the potential can be done as shown in FIG. 3 at machines in which the work-piece 2, being held by a chuck 17 on the shaft 18, rotates, partly by direct connection to a suitable point P1 on the stand of the machine and partly by connection to the rotating part of the machine over the slip ring 13 and a brush 12.

The shunting of the sensing circuit 3, through the stand of the machine, decreases the potential across the resistance 4, but the potential is as a rule fully adequate to ensure the amplification and use thereof. The points P1 and P2 should be situated as near the point of contact between tool and work-piece as possible. In machines with rotating work-piece, the method shown in FIG. 2 is preferred, as it causes the least possible modification of the machine to be supervised.

If the thermo potential is suitably tapped, a potential of the magnitude some mv. is as a rule obtained whereby it is presupposed that the amplifier is situated near to the machine or that the conductors to the amplifier are screened and low capacitive, so that irrelevant disturbances of inductive or capacitive nature will not cause false indicating. Of course, if the thermo potential has a sufficient level the amplifier can be omitted.

I claim:
1. Apparatus for indicating the time during which a metal working tool of a machine tool works a metal workpiece, said apparatus comprising, in combination, a recorder for indicating the time during which the workpiece is worked, means for detecting the thermo-potential developed across a thermojunction formed by the engaging surfaces of the working tool and the workpiece during the working of the workpiece, sensing circuit means for applying the thermo-potential developed across said thermojunction and detected by said detecting means to said recorder to indicate the time during which the workpiece is worked, and means connected between said detecting means and said recorder for amplifying said thermo-potential.

2. Apparatus adapted for use with a machine tool in which the workpiece is rotary while being worked, for indicating the time during which a metal working tool of a machine tool works a metal workpiece, said apparatus comprising, in combination, a recorder for indicating the time during which the workpiece is worked, means for detecting the thermo-potential developed across a thermo-junction formed by the engaging surfaces of the working tool and the workpiece during the working of the workpiece, said detecting means comprising a first electrical conductor for electrically conductive connection to the working tool and a second electrical conductor including a slip ring arranged in electrically conductive connection with said workpiece and a brsuh for electrical connection to said slip ring, and sensing circuit means for applying the thermo-potential developed across said thermo-junction and detected by said detecting means to said recorder to indicate the time during which the workpiece is worked.

3. Apparatus for indicating the time during which a metal working tool of a machine tool works a metal workpiece, said apparatus comprising, in combination, a recorder for indicating the time during which the workpiece is worked, means for detecting the thermo-potential developed across a thermo-junction formed by the engaging surfaces of the working tool and the workpiece during the working of the workpiece, said detecting means including a first electrical conductor for electrically conductive connection to the working tool and a second electrical conductor for electrically conductive connection to the workpiece, and sensing circuit means connected to said first and said second conductors for applying the thermo-potential difference between said first and said second conductors to said recorder during the time said work is performed.

4. Apparatus for indicating the time during which a metal working tool of a machine tool works a metal workpiece, said apparatus comprising, in combination, a recorder for indicating the time during which the workpiece is worked, a first conductor connected to said working tool, a second conductor connected to said workpiece, said conductors detecting the thermo-potential developed across a thermo-junction formed by the engaging surfaces of the working tool and the workpiece during the working of the workpiece, and sensing circuit means for applying the detected thermo-potential developed across said thermo-junction to said recorder to indicate the time during which the workpiece is worked.

5. Apparatus for indicating the time during which a metal working tool of a machine tool works a metal workpiece, said apparatus comprising, in combination, a recorder for indicating the time during which the workpiece is worked; means for detecting the thermo-potential developed across a thermo-couple; said thermo-couple comprising at least a portion of said working tool, a portion of said workpiece, and a thermo-junction formed by the engaging surfaces of the working tool and the workpiece during the working of the workpiece; and circuit means for applying the thermo-potential developed across said thermo-couple and detected by said detecting means to said recorder to indicate the time during which the workpiece is worked.

References Cited in the file of this patent
UNITED STATES PATENTS

| | | |
|---|---|---|
| 1,379,909 | Gilbert | May 31, 1921 |
| 2,306,372 | Banks | Dec. 29, 1942 |
| 2,314,753 | Asimow | Mar. 23, 1943 |
| 2,340,114 | Duis | Jan. 25, 1944 |
| 2,423,479 | Cladwell | July 8, 1947 |
| 2,892,156 | Dawson | June 23, 1959 |
| 2,946,646 | Bower et al. | July 26, 1960 |